Figure 1:
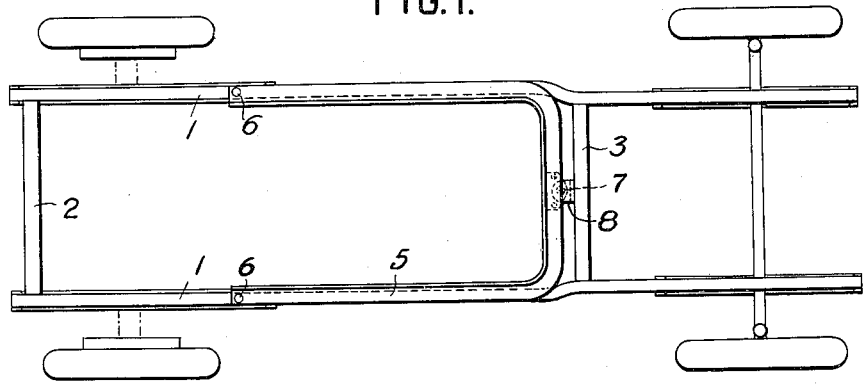

W. L. FRY.
AUTOMOBILE BODY.
APPLICATION FILED FEB. 3, 1917.

1,297,674.

Patented Mar. 18, 1919.
2 SHEETS—SHEET 1.

W. L. FRY.
AUTOMOBILE BODY.
APPLICATION FILED FEB. 3, 1917.
1,297,674.
Patented Mar. 18, 1919.
2 SHEETS—SHEET 2.
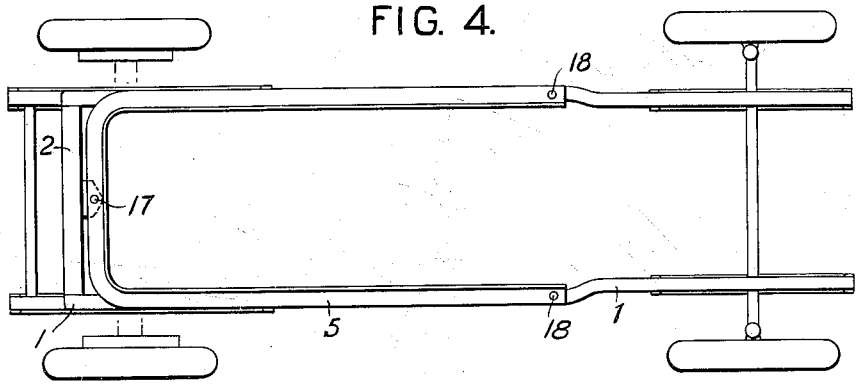
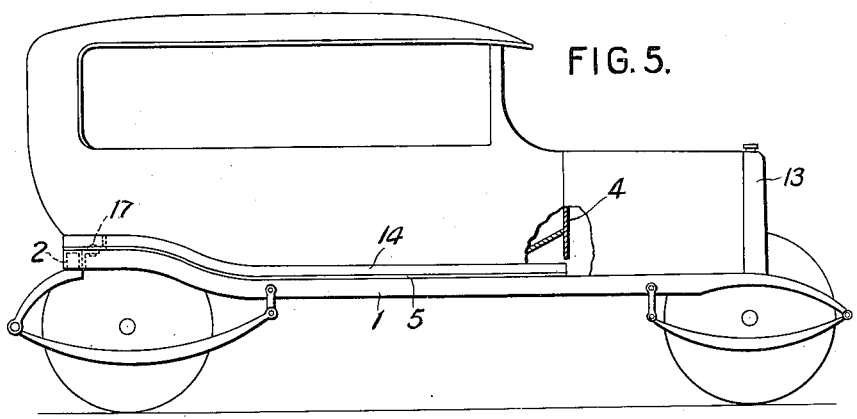
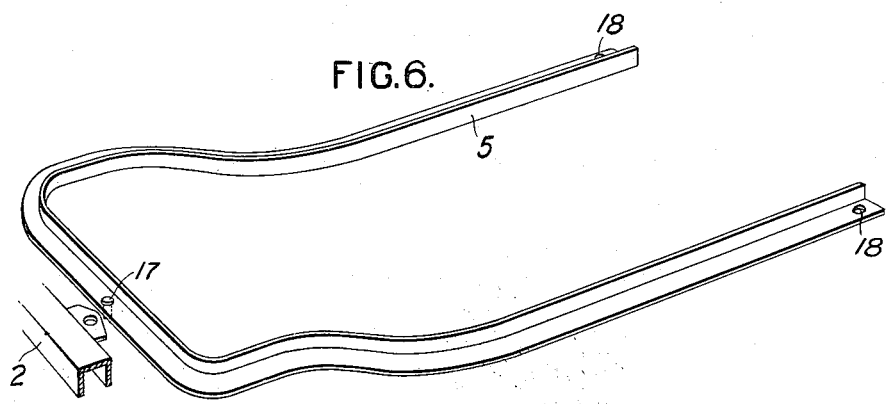

UNITED STATES PATENT OFFICE.

WALTER L. FRY, OF DETROIT, MICHIGAN, ASSIGNOR, BY MESNE ASSIGNMENTS, TO FINANCE & TRADING CORPORATION OF NEW YORK, A CORPORATION OF VIRGINIA.

AUTOMOBILE-BODY.

1,297,674.      Specification of Letters Patent.      Patented Mar. 18, 1919.

Application filed February 3, 1917. Serial No. 146,322.

*To all whom it may concern:*

Be it known that I, WALTER L. FRY, a citizen of the United States, a resident of the city of Detroit, county of Wayne, State of Michigan, have invented an Improvement in Automobile-Bodies, of which the following is a specification.

My invention relates to means for supporting an automobile body upon a chassis frame, in such a manner that torsional movements in the chassis frame will not be transmitted to the body and that in this manner movement of the parts of the body, relative to one another, will be prevented.

It will be understood that the chassis frame of an automobile is a rectangular frame built up of members having a relatively slight depth and being substantially unprovided with diagonal bracing. This chassis frame is usually supported at four points upon the running gear, and due to its mode of construction and support it is peculiarly subject to torsional deformation, whereby, under certain conditions, one corner may be lifted or depressed an appreciable amount above or below the other three corners of the frame. This is particularly true in the case of modern automobiles in which the endeavor to secure light weight of the vehicle has resulted in a considerable lightening of the frame members.

The body of an automobile, is, according to modern practice, built up upon two longitudinal sills, which are tightly bolted to the side members of the frame, and all chassis frame movements are therefore transmitted to the body. The body framing and the sheathing or plates attached thereto, being built up upon the sills and rigidly connected together, are thus, through the torsional movement moved with respect to one another and are thus inevitably loosened, producing cracking at the joints, loose plates and sometimes actual rupture of the parts.

By my improved construction, I am enabled to permit torsional movement of the chassis frame, without communicating such movement to the body, and I achieve this result by supporting the body upon a supporting frame which is attached to the chassis frame, and may, to a degree, move independently of it. I prefer to support the supporting frame upon the chassis at three points only, so that movement of one corner of the chassis frame with respect to the other three will not affect the body. In connection with the supporting frame, I provide means whereby the body may be lifted as a whole from the chassis frame, thus exposing the working parts of the chassis with the least difficulty.

Figure 2:
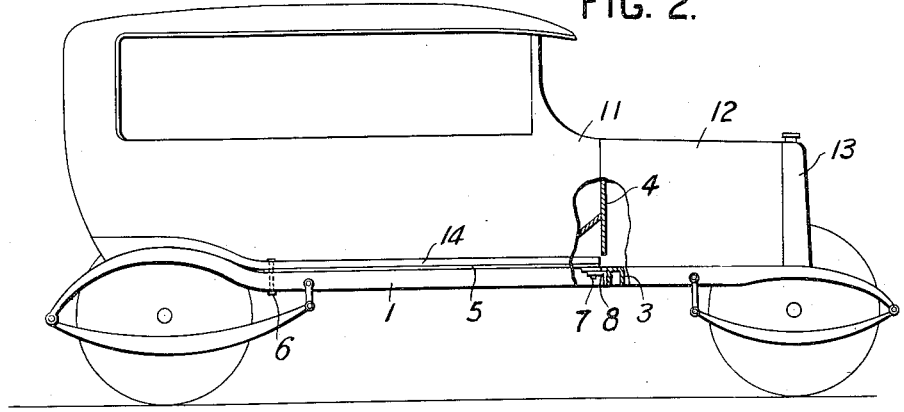
Figure 3:
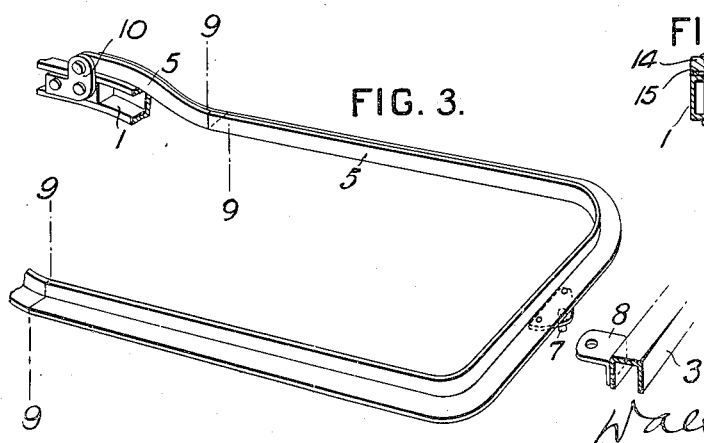
Figure 7:
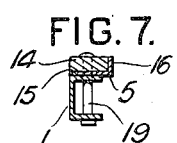
Figure 8:
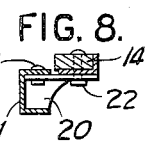
Figure 9:
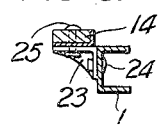

In the drawings, Figure 1 is a plan view of an automobile chassis, embodying my invention; Fig. 2 is a side view partly in section, of an automobile embodying my invention; Fig. 3 is a detail perspective view of one form of supporting the frame embodying my invention; Fig. 4 is a plan view of an automobile chassis embodying another modification of my invention; Fig. 5 is a side view of an automobile embodying the modification shown in Fig. 4; Fig. 6 is a detail perspective view of the supporting frame shown in Figs. 4 and 5; Figs. 7, 8 and 9 are detail views showing various methods of attaching the supporting frame to the side members of the chassis frame.

Referring to Figs. 1, 2 and 3, it will be seen that the chassis frame comprises a pair of longitudinal side frame members 1, a cross member 2 at the back of the chassis frame and a cross member 3 connecting the side members 1, adjacent to the dash-board 4 of the vehicle. Upon the chassis frame is mounted the supporting frame 5, which is connected to the side members 1, at the points 6. The forward end of the supporting frame carries means for connecting the supporting frame to the cross member 3 of the chassis frame, which means may be a pin 7 adapted to fit into an aperture or socket upon a bracket 8, attached to the cross member 3. The supporting frame 5 may extend substantially the entire distance between the cross member 3 and the back of the vehicle, as shown in Fig. 3, or may be cut off immediately forward of the drop in the chassis frame, as indicated by the dotted lines 9—9 of Fig. 3 and as shown in Fig. 1.

If the supporting frame 5, extends substantially the entire distance from the cross member 3 to the rear of the chassis frame, I prefer to connect it by means of a pivot or hinge 10, to the chassis frame. By means of the hinge connection, it is possible to lift the forward end of the supporting frame 5, carrying the body with it, and thus expose the operating parts of the chassis underneath the body.

It will be noted that the vertical end of the supporting frame 5 is adjacent to the dash-board line of the body, so that any movement which may take place between the body and the chassis frame will be taken up between the cowl 11 of the body, and the bonnet 12 over the engine attached to the chassis frame.

The body may be conveniently mounted by forming the supporting frame 5 of a member having an angular cross section as shown in Figs. 3, 6, 7, 8 and 9, and by placing the longitudinal sills 14, upon which the body is erected, upon the horizontal flange 15 of the frame, and in contact with its vertical flange 16. Such a construction forms a rigid support for the sills and prevents any possible side movement thereof. Although the supporting frame is connected to the chassis frame at three points only, the body sills may be connected to the supporting frame in any suitable manner, as by bolts passing through the sills and the horizontal flanges of the supporting frame.

In the modifications illustrated in Figs. 4, 5 and 6, the supporting frame 5 is connected to the rear cross member 2 of the chassis frame at one point only, as at 17, and the front ends of the supporting frames are connected to the side members of the chassis frame adjacent to the dash-board as at the points 18. In such a construction, the supporting cross member 3 may be omitted.

In either of the modifications described, the ends of the supporting frame may be connected to the chassis frame in any suitable manner, as, for instance, by means of the hinge 10, as shown in Fig. 3, or in the various ways shown in Figs. 7, 8 and 9. Thus, in Fig. 7, I have shown the supporting frame 5 carrying the body sill 14 supported directly above the side member 1, and attached thereto by means of a bolt 19.

In Fig. 8 I have shown the supporting frame 5 carrying the body sill 14, supported inside the chassis frame by means of a bracket 20, the bracket being secured to the chassis frame by suitable bolts or rivets 21, and the supporting frame being secured to the brackets by means of the bolt 22.

In Fig. 9 I have shown the supporting frame carried outside of the side member 1, by means of a bracket 23, secured to the side member 1 by means of suitable bolts or rivets 24, the supporting frame being secured to the bracket by means of bolt 25.

It will be understood that the forms of my invention illustrated, are intended to be typical only of its embodiment in an automobile structure, and that I do not intend to confine myself to the particular modifications shown and described, since it is obvious that many changes may be made without departing from the spirit of my invention.

What I claim is:

1. In a device of the kind described, a body comprising a pair of longitudinal sills and a supporting frame having an inner upstanding and an outer horizontal flange contacting with two edges of the sills.

2. In a device of the kind described, a body comprising a pair of longitudinal sills of rectangular cross section and a supporting frame of angular cross section, comprising an inner upstanding and an outer horizontal flange, one flange of said angle being disposed underneath the sills and the other flange at one side thereof.

3. In a device of the kind described a chassis frame, a supporting frame of angular cross-section hinged at two points to said chassis frame and connected at one point to said chassis frame at the opposite end of the vehicle and a pair of longitudinal body sills resting upon the horizontal flange of the angle and adjacent to its vertical flange.

4. In a device of the kind described, a rigid chassis frame, a U-shaped supporting frame, having its closed end toward the front end of the chassis frame, a body carried thereby and hinges connecting the rear ends of the supporting frame to the chassis frame.

5. In a device of the kind described, a body, a chassis frame, a supporting frame hinged thereto at two points in the rear and connected to the chassis frame at one point in front and extending from a point between the rear and front wheels to a point adjacent to the dash-board of the body.

6. In a device of the kind described, a chassis frame having side members and a cross member connecting said side members adjacent the front end of the frame, and a body supporting frame connected at one point to each of said side members intermediate the front and rear wheels, and at one point to the cross member.

In testimony whereof, I have signed my name to this specification this 30th day of January, 1917.

WALTER L. FRY.